United States Patent

[11] 3,587,952

| [72] | Inventor | Takeo Higuchi<br>83-8, Aoyanagi, Ikeda-cho, Ibi-gun, Gifu-ken, Japan |
|---|---|---|
| [21] | Appl. No. | 849,379 |
| [22] | Filed | Aug. 12, 1969 |
| [45] | Patented | June 28, 1971 |
| [32] | Priority | Aug. 13, 1968 |
| [33] | | Japan |
| [31] | | 43-69722 |

[54] BABY CARRIER
4 Claims, 5 Drawing Figs.

| [52] | U.S. Cl. | 224/6 |
|---|---|---|
| [51] | Int. Cl. | A47d 13/02 |
| [50] | Field of Search | 224/5—17, 5—23, 6 |

[56] References Cited
UNITED STATES PATENTS

| 416,970 | 12/1889 | Taylor | 224/(6) |
|---|---|---|---|
| 576,292 | 2/1897 | Vanderburgh | 224/(6) |

*Primary Examiner*—Gerald M. Forlenza
*Assistant Examiner*—Jerold M. Forsberg
*Attorney*—Linton & Linton ABSTRACT: This invention relates to a baby carrier for safely holding and carrying a baby, comprising a soft main carrier to serve as a seat or bedding for a baby, a supporter removably fastened and extended from a number of edges of the main carrier, and shoulder strings to retain the said main carrier at the neighborhood of the breast of a nurse, the said main carrier having two openings at the near of its one end for inserting both legs of a baby in order to rest a baby on its back or in a position comfortable for settling its body in the body of a nurse.

INVENTOR
TAKEO HIGUCHI

BY Linton and Linton
ATTORNEYS

PATENTED JUN28 1971

INVENTOR
TAKEO HIGUCHI

BY Linton and Linton
ATTORNEYS 3,587,952

BABY CARRIER

BACKGROUND OF THE INVENTION

This invention relates to a baby carrier and further relates to a device for placing a baby in a safe and pleasant position close to the body of a nurse in holding and carrying a baby.

It has been a usual experience to find nurses carrying babies rested on small beds of molded synthetic resin suspended from shoulder strings. At least in the art of providing baby carriers, a bed made of a hard material assembled with one or more shoulder strings has been known for its advantage of permitting a baby to be rested on such a bed free from pressure and not receiving the load applied to such shoulder strings either. On the other hand, however, such a baby carrier involving a hard bed is likely to lose a baby from its body and require an attachment to confine the baby on the bed. Such a carrier also has a disadvantage of imposing the weight of the bed to a fairly large burden of a nurse and a further inconvenience in carrying the carrier itself owing to its uncollapsible construction.

Another type of baby carriers known hitherto combines a main carrier of a cloth or net instead of a hard bed with one or more shoulder strings. This eliminates such disadvantages of the aforementioned type of baby carriers, but unlike carriers using hard beds, this type of carriers produce undesirable effects like giving excessive pressure upon the body of a baby to be carried, particularly upon its breast or abdomen. It is obvious that such a shortcoming arises from the soft construction of the main carriers which lose their shapes upon receiving the load imposed upon the shoulder strings when babies are carried in the main carriers. But, more importantly, these disadvantages should be attributed to the fact that no adequate measure has been so far employed for the construction of such devices to eliminate these shortcomings, because conventional baby carriers of cloth have used sheets of soft main carriers of enough sizes and shapes without any definite renovation, only replacing hard beds.

The general object of the present invention, therefore, is to provide a baby carrier for eliminating all or almost all the shortcomings such as aforementioned of conventional baby carriers.

Another object of the invention is to provide a baby carrier for safely securing the body of a baby free of excessive pressure and resting it on its back or in comfortable position of settling its body in the body of a nurse.

Another object of the invention is to provide a simple baby carrier for portable use including a main carrier comprising a soft and collapsible material such as a cloth or mesh cloth.

SUMMARY OF THE INVENTION

The present invention provides a baby carrier having a main carrier forming a comfortable seat or bedding for a baby and shoulder strings which enable a nurse to safely and easily hold the main carrier.

Particularly, this invention provides a baby carrier with the said main carrier made up of a collapsible material of light weight such as a cloth having a plain appearance approximate to an isosceles triangle with corner reinforcements arranged at the respective angles of the said main carrier of triangular shape, and having two openings formed adjacent to a corner reinforcement at the vertical angle portion of the main carrier and adapted to secure the body of a baby when its both legs are inserted through the said openings with its back rested towards the edge of the base facing the said vertical angle portion.

Also, this invention provides a baby carrier having shoulder strings for supporting the said main carrier with its three corner reinforcements suspended from the said shoulder strings which, by wearing them on the body of a nurse, will serve to position the main carrier closely adjacent to the body of the nurse.

Further, this invention provides a baby carrier having at each edge of the main carrier an optional type of hooking means such as hooks, buttons and fasteners to which may removably be fitted a supporter including corresponding hooking means to the aforementioned hooking means, the said supporter being adapted to rest the head of a baby extending from the said main carrier and thereby to keep the body of a baby stretched on its back.

The characteristic feature of the invention makes it possible to change the position of the main carrier in relation to the body of a nurse by changing the position of the shoulder strings without inserting both legs of a baby through the main carrier, in other words, to rest the body of a baby in the right angle with the perpendicular to the vertical angle portion of the main carrier, other than the usual method of resting a baby in the same direction with the said perpendicular to the said vertical angle portion of the main carrier.

As it may be apparent from the above description, the main carrier is formed in the plain shape approximate to an isosceles triangle having three corner reinforcements so as to suspend the said main carrier with the shoulder strings in good proportion to the latter, thereby providing a remedy to reduce such conventional shortcomings as a collapsing main carrier by the load imposed upon shoulder strings and prevent excessive pressure upon the body of a baby in such a collapsing main carrier. Especially, in this invention, the openings provided for the main carrier eliminate the likelihood of forcing the legs of a baby in the main carrier or pressing the protruding legs of a baby from the main carrier between an edge of the main carrier and the body of a nurse, so as to permit her to hold a baby in a comfortable position just as resting in an armchair or stretching on its back.

The foregoing objects and features of the invention will be better understood from the following detailed description of the preferred embodiments of the invention aided by the accompanying drawings.

DESCRIPTION OF THE PREFERRED EMBODIMENTS

Figure 1:
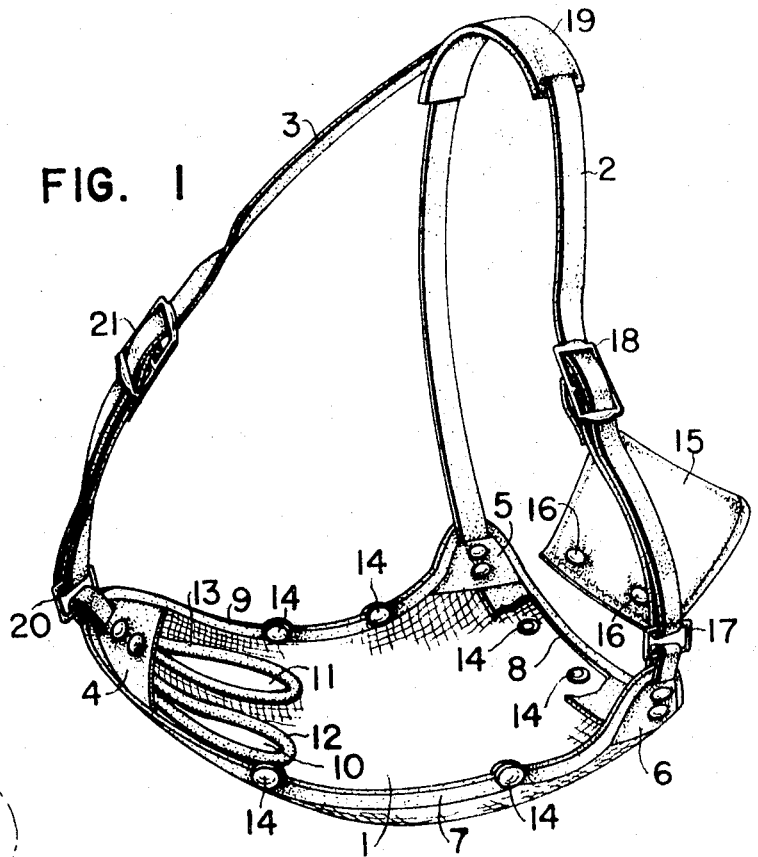
FIG. 1 is a perspective view of an embodiment of the baby carrier.

FIG. 1 shows a baby carrier of simplest construction according to the invention. In this embodiment, the main carrier with reference numeral 1 is inseparably assembled with shoulder strings 2 and 3. The said main carrier 1 made of a cloth forms a plain shape with three corners approximate to a isosceles triangle. Each of the said corners is provided with a stronger material, for example, leather, synthetic resin or the like sewed on the corners forming corner reinforcements 4, 5 and 6. Also edges between two of the reinforced corners of the main carrier 1 are forming the respective edge reinforcements 7, 8 and 9. Adjacent to the corner reinforcement 4 at the vertical angle portion, two openings 10 and 11 are shown towards the center of the main carrier 1. These openings are meant for inserting the both legs of a baby with their circular forms adapted to the size of a baby's legs. They are also provided on their circular edges with pads 12 and 13 made of a soft material for protecting a baby's legs, at the same time forming reinforcements for the both openings. Snaps of suitable type attached to the each edge reinforcement of the said main carrier 1 are shown with a common reference numeral 14. These snaps are provided for fitting a supporter indicated by numeral 15, equipped with snaps 16 corresponding to the aforementioned snaps 14. Apparently, the said supporter enables a nurse to fit the same to a position convenient for use, also helping her to carry a baby together with the said main carrier.

Figure 3:
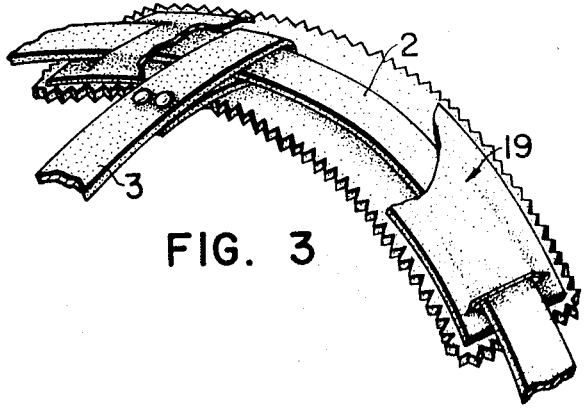
FIG. 3 is a perspective view of the shoulder pad shown in FIGS. 1 and 2 partially cut away.

In this embodiment, as previously described, the main carrier 1 and the shoulder strings 2 and 3 comprise the baby carrier as an inseparable assembly. One end of the shoulder string 2 is directly sewn on the tip of the corner reinforcement 5 of the main carrier 1, returning and terminating at the adjusting metal piece 18 inserted in the middle of the shoulder string 2. In this case, as shown in FIG. 3, in the middle of the said shoulder string 2 provided a shoulder pad 19 made of a felt for sliding on the nurse's shoulder irrespective of the length of the said shoulder string, thus preventing the shoulder string from being forced onto the nurse's shoulder. Another shoulder string 3 encircles and engages with the said shoulder string 2 on the cover of the said shoulder pad 19 and other end, as in the same manner as the said shoulder string 2, extending through a metal piece 21 to the ring 20 arranged at the tip of the corner reinforcement 4 of the main carrier 1 and returning to the said metal piece 21. It is understood that both the shoulder strings 2 and 3 can be adjusted in their lengths by means of the metal pieces 18 and 21 according to the size of a baby to be carried.

Figure 2:
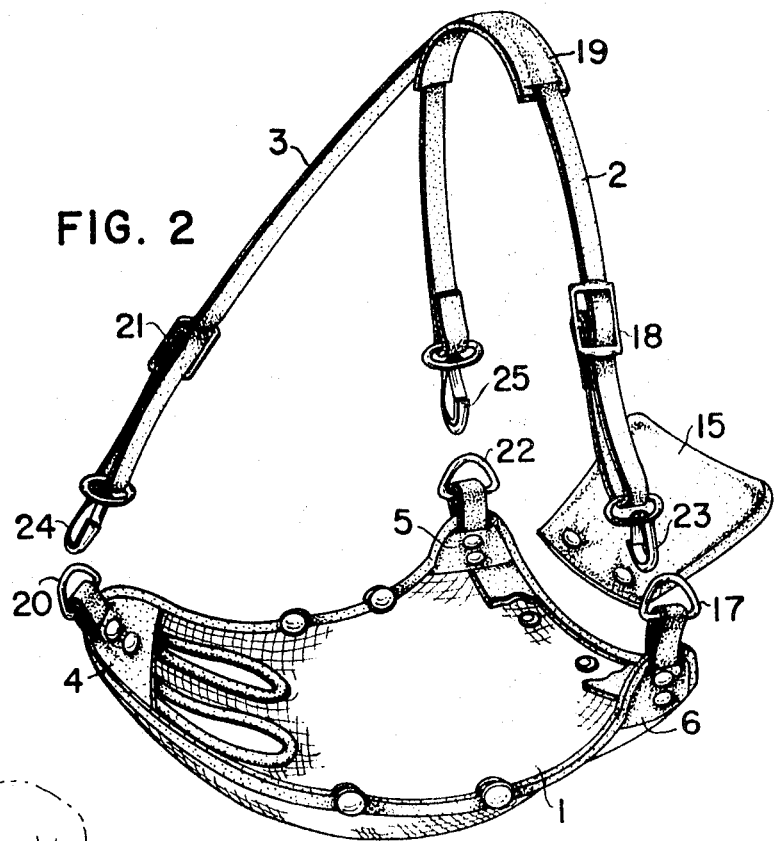
FIG. 2 is a perspective view of an embodiment rather different from that shown in FIG. 1.

FIG. 2 shows another embodiment of the invention in its more improved application than that shown in FIG. 1. In this embodiment, the shoulder strings 2 and 3 can be readily removed from the main carrier 1. In other words, rings 17 and 20 are arranged at the corner reinforcements 4 and 6 of the main carrier 1 as in the case of the first embodiment. But the shoulder strings 2 and 3 do not go through these rings and the remaining corner reinforcement 5 is provided with a ring 22 of the same type as the said rings 17 and 20 instead of the arrangement shown in the first embodiment. While the adjustable free ends of the shoulder strings 2 and 3 have hooks 23 and 24 with rings for passing through the shoulder strings, each corresponding to the rings 17 and 20 of the main carrier 1. A same type of hook 25 is provided for the fixed free end of the shoulder string 2, corresponding to the said ring 22. If the shoulder strings 2 and 3 do not permit removal from the main carrier 1 as shown in the first embodiment, a nurse will have to let her head go through the circle formed by the said shoulder strings 2 and 3. In this embodiment, however, a nurse can pass the shoulder strings behind her shoulder with their each end held by her hand, thereby easily fitting the baby carrier on her body. It is noted that hooks and rings rotatably connected each other will be convenient to readily release the twist of the shoulder strings 2 and 3.

In the two aforementioned embodiments of this invention, the main carrier 1 shown as made of a cloth may be replaced by that of a mesh cloth probably for use under higher atmospheric temperature in offering comfortable ventilation for a baby to be carried.

Figure 4:
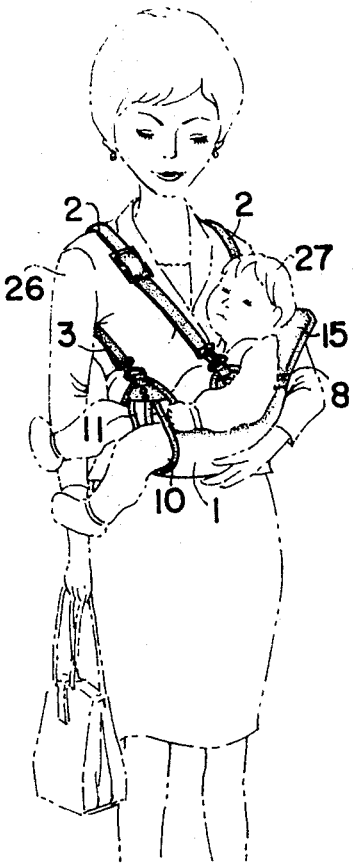
FIG. 4 is a perspective view of the embodiment in use shown in FIG. 1.
Figure 5:
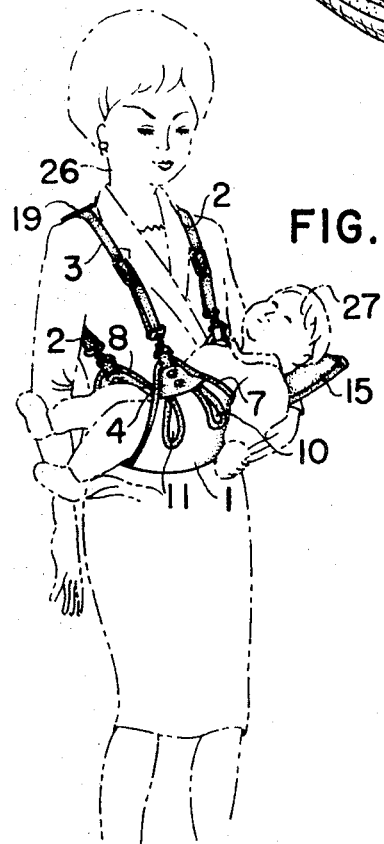
FIG. 5 is a perspective view of the embodiment in other use than that shown in FIG. 4.

In FIGS. 4 and 5, typical embodiments of the invention are shown. FIG. 4 is a preferable embodiment to offer the feature of this invention in its most effective form, while FIG. 5 is adapted for use in carrying a baby in rather shorter time durations. In FIG. 4, the shoulder string 2 reaches to the right front position of a nurse 26 from the left front position of her passing behind her neck. The shoulder pad 19, in this case, is positioned behind her neck, where the greatest load is applied, to prevent the shoulder string 2 being forced onto the body of a nurse 26. Another shoulder string 3 reaches from the said shoulder pad 19 to the right front position of a nurse 26 passing behind her right shoulder and armpit. Each end of the shoulder strings 2 and 3 guided to the front of a nurse 26 secures the main carrier 1 in order that the edge reinforcement 9 contacts with her breast and abdomen. In this position, the main carrier 1 is ready for accepting a baby upon itself. Most of the body of a baby 27 will be supported by the main carrier 1 with its both legs projecting through the openings 10 and 11 just as it rests in an armchair. In this case, therefore, the supporter 15 fitted to the edge shown by numeral 8 will safely hold the head of a baby 27. In another embodiment in FIG. 5, the shoulder string 2 crosses the back of a nurse 26 from her left front shoulder and reaches to the front of her right armpit, thereby enabling the edge 8 of the main carrier 1 to be contacted with the body of a nurse 26. The shoulder string 3, in this case, reaches to the right front shoulder through the shoulder pad 19 positioned at the back of a nurse 26 and supports the corner reinforcement 4 at the vertical angle portion of the main carrier 1. In this embodiment, the supporter 15 will be fitted to the edge 7 of the main carrier 1 as a baby 27 is rested in the main carrier 1 at a right angle with the perpendicular passing the vertical angle portion of the main carrier. It is understood, in this case, that the openings 10 and 11 of the main carrier are idle. It is noted that in either of the two embodiments, the baby carrier can be positioned conversely with the cases shown in FIGS. 4 and 5 to rest the head of a baby 27 at the right side of a nurse 26. For this purpose, the edge 9 of the main carrier 1 is also provided for fitting the supporter 15.

It will be appreciated that many variations may be employed in carrying out the method hitherto described in detail by those familiar in this art while following the general principles of the invention and without departing from the scope thereof as defined in the appended claims.

I claim:

1. A baby carrier for carrying a baby, comprising a three-cornered main carrier made of a soft material like a cloth, forming a plain shape approximate to an isosceles triangle, a shoulder string connected with two corners adjacent to a edge at the base of the said main carrier, another string connecting the middle of the aforementioned shoulder string with a corner at the vertical angle portion of the main carrier, the said main carrier serving as a seat or bedding for a baby and provided with openings sufficient for inserting both legs of a baby at the neighborhood of the corner at the vertical angle portion of the main carrier, the said shoulder strings serving for holding the said main carrier on the body of a nurse with their lengths adjustable according to the size of a baby.

2. A baby carrier according to claim 1, wherein metal rings arranged at the each tip of the corners of the main carrier and hooks at the each substantial end of the shoulder strings removable from the said main carrier by unhooking the hooks from the said metal rings.

3. A baby carrier according to claim 1, wherein hooking means are arranged at each edge of the main carrier and a supporter having corresponding hooking means with the said hooking means for fitting and extending the said supporter from any edge of the main carrier.

4. A baby carrier according to claim 1, wherein the said main carrier is made of a mesh cloth.